United States Patent
Hartless et al.

(10) Patent No.: US 8,953,729 B1
(45) Date of Patent: Feb. 10, 2015

(54) METHOD FOR SYMBOL SAMPLING IN A HIGH TIME DELAY SPREAD INTERFERENCE ENVIRONMENT

(71) Applicant: Harris Corporation, Melbourne, FL (US)

(72) Inventors: Mac L. Hartless, Forest, VA (US); Richard D. Taylor, Moneta, VA (US); Steve R. Wynn, Lynchburg, VA (US)

(73) Assignee: Harris Corporation, Melbourne, FL (US)

( * ) Notice: Subject to any disclaimer, the term of this patent is extended or adjusted under 35 U.S.C. 154(b) by 3 days.

(21) Appl. No.: 14/016,273

(22) Filed: Sep. 3, 2013

(51) Int. Cl.
*H04L 7/00* (2006.01)

(52) U.S. Cl.
CPC .................................. *H04L 7/0029* (2013.01)
USPC .......................................................... 375/355

(58) Field of Classification Search
CPC ..... H04L 7/0337; H04L 7/0334; H04L 7/033; H04L 7/0029; H03L 7/091
USPC .......................................................... 375/355
See application file for complete search history.

(56) References Cited

U.S. PATENT DOCUMENTS

| | | | |
|---|---|---|---|
| 5,648,991 A * | 7/1997 | Namekata et al. ............ | 375/341 |
| 6,628,736 B1 * | 9/2003 | Legrand et al. ............... | 375/355 |
| 7,729,441 B2 * | 6/2010 | Taylor ........................... | 375/295 |
| 8,219,893 B2 * | 7/2012 | Kim et al. ..................... | 714/780 |
| 8,249,199 B2 * | 8/2012 | Doblar et al. ................. | 375/340 |

* cited by examiner

*Primary Examiner* — Juan A Torres
(74) *Attorney, Agent, or Firm* — Robert J. Sacco, Esq.; Fox Rothschild LLP

(57) ABSTRACT

Symbol sampling in a high time delay spread interference environment includes acquiring (602) a time varying baseband waveform. The waveform has a signal amplitude that varies between one of a plurality of symbol states. The waveform is sampled (603) at a rate of m times the symbol rate. During an evaluation time, an error value is calculated (604, 606) for each of m data sample positions. Each of the error values comprises an average distance between the measured value of the waveform as indicated by the data sample and a closest known symbol value. The error values are used to create an error surface. Thereafter, the error surface is modeled as a quadratic and an optimal sample time is determined (608, 610, 612) based on finding the time location where the quadratic surface is minimum. A sinc interpolator is then used to resample the data.

20 Claims, 12 Drawing Sheets

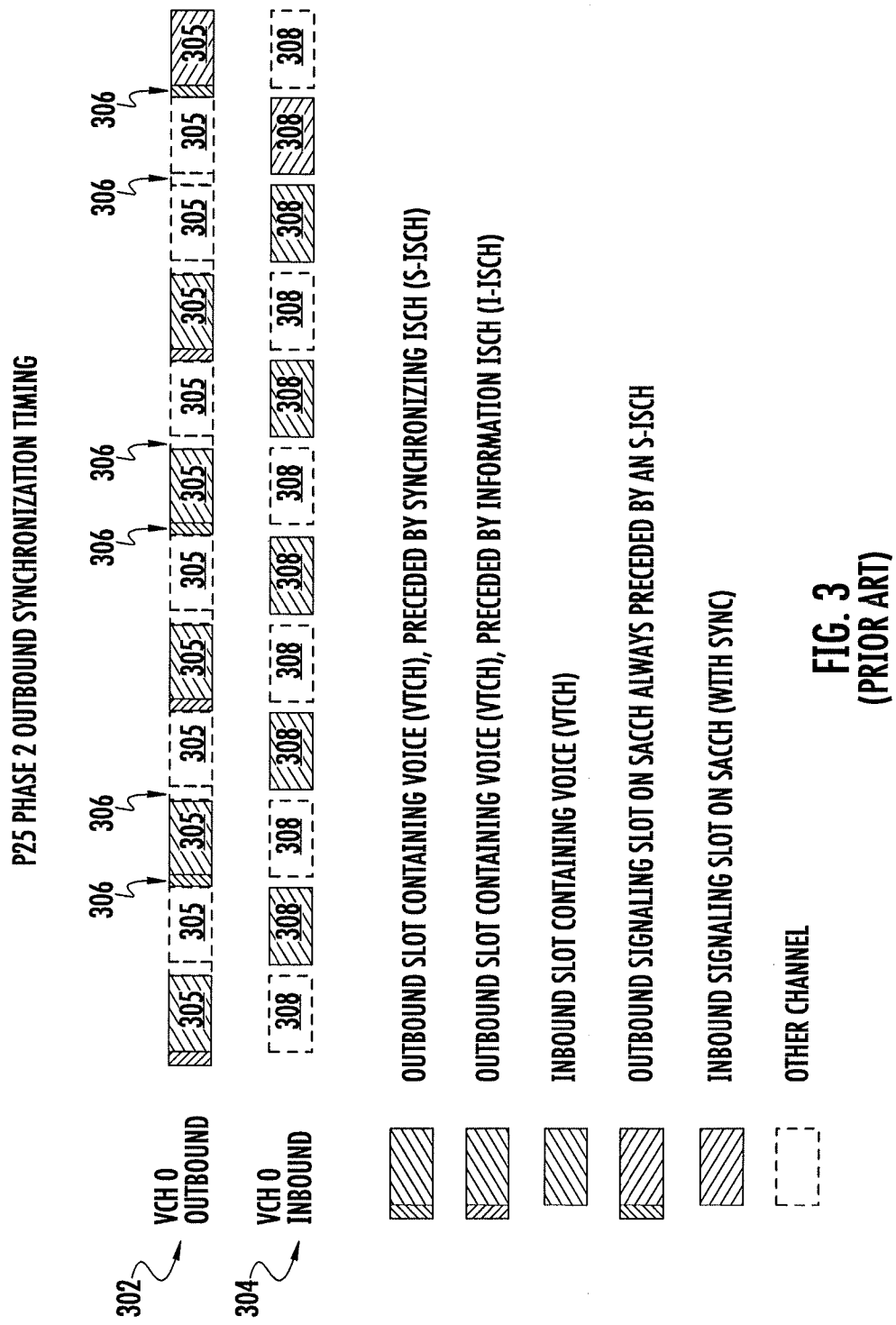

Application No. 14/016,273
Amendment Dated: December 8, 2014
Reply to Office Action of November 7, 2014
REPLACEMENT SHEET

US 8,953,729 B1

METHOD FOR SYMBOL SAMPLING IN A HIGH TIME DELAY SPREAD INTERFERENCE ENVIRONMENT

BACKGROUND OF THE INVENTION

1. Statement of the Technical Field

The inventive arrangements relate to radio communications and more particularly to improvements in symbol sampling in communications environments where a significant amount of delay spread exists.

2. Description of the Related Art

Simulcast systems create delay spread at receive sites that is proportional to site spacing. The delay spread is known to degrade the bit-error-rate (BER) of receive radios in site overlap areas. Coverage area of a simulcast system can be improved by reducing the adverse effects that delay spread has upon BER. When the coverage area is improved in this way, the number of simulcast transmitter sites can be reduced, thereby lowering overall infrastructure costs.

Symbol synchronization is used to estimate the optimal time for sampling each symbol in a received signal. Improved symbol synchronization is a key factor for purposes of reducing BER. Conventional synchronization methods involve correlating a burst of a limited number of received symbols contained in a "synchronization field" with a known set of reference symbols. The symbols contained in the synchronization field do not represent user data and therefore comprise overhead in the communication system. Accordingly, the number of symbols contained in the synchronization field and the frequency of such fields is intentionally limited.

The foregoing synchronization approach maximizes the available bandwidth for throughput of user data. Still, due to the limited number of synchronization symbols, conventional synchronization methods take a relatively long time to converge to the optimal synchronization time when operating in a high delay spread environment. This slow synchronization process can severely degrade the time required to establish initial synchronization and call start.

SUMMARY OF THE INVENTION

Embodiments of the invention concern a method for symbol sampling in a digital communication system. The method involves acquiring a time varying baseband waveform in which a signal amplitude varies between one of a plurality of symbol states. The waveform is sampled at m times the symbol rate, where m will be referred to as the oversample rate i.e. there are m samples covering a symbol period. During an evaluation time, an error value is calculated for each of m data sample positions. Each of the error values comprises an average distance between the measured value of the waveform as indicated by the data sample and the closest known symbol value. Thereafter, an optimal sample time is determined based on the calculated error values.

According to another aspect, the invention concerns a radio frequency (RF) communication device. The radio frequency communication device includes an RF receiver. The RF receiver is configured to acquire a time varying baseband waveform as described above. The RF communication device also includes at least one electronic circuit. The at least one electronic circuit is configured to oversample the waveform at an oversample rate of m. During an evaluation time, the at least one electronic circuit calculates an error value for each of m data sample positions. Each error value comprises an average distance between the measured value of the waveform as indicated by the data sample and a closest known symbol value. Subsequently, the at least one electronic circuit determines an optimal sample time based on the calculated error values.

BRIEF DESCRIPTION OF THE DRAWINGS

Embodiments will be described with reference to the following drawing figures, in which like numerals represent like items throughout the figures, and in which:

FIG. 3 is a data structure diagram that illustrates a traffic channel structure in a Project 25, Phase 2 compliant system.

DETAILED DESCRIPTION

The invention is described with reference to the attached figures. The figures are not drawn to scale and they are provided merely to illustrate the invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
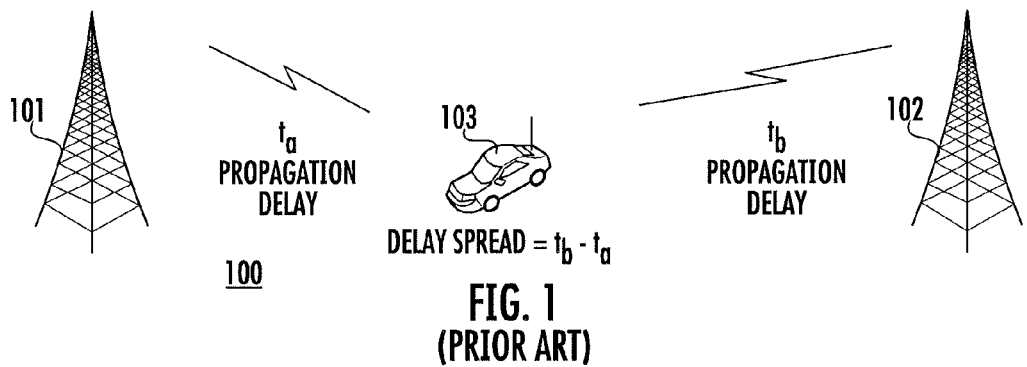
FIG. 1 is a diagram that is useful for understanding the concept of delay spread.

Referring now to FIG. 1 there is shown an exemplary simulcast communication system 100. In system 100 the same data is synchronously transmitted from two or more transmitter sites 101, 102 on the same frequency. The transmitter sites are situated in different locations so that a larger coverage area is obtained as compared to that which would be possible with only a single transmitter. When a receiver 103 is located in an area that is intermediate of the two or more transmitter sites, the received signal will be a composite of all transmitters within range of the receiver. Within this overlap region delay spread is experienced by the receiver due to the different amounts of time required for transmission of signals from each transmitter. For example, in the example, shown the delay spread will be $t_a-t_b$, where $t_a$ is the propagation delay from transmitter site 101 to receiver 103, and $t_b$ is the propagation delay from transmitter 102 to receiver 103.

In a telecommunication system, a received digital data signal can be repetitively sampled and displayed on an oscilloscope. For certain types of data modulation schemes, the resulting pattern that is displayed will look like a series of eyes. For example, an exemplary eye pattern including eye 702 is shown and discussed in relation to FIG. 7A. The eye pattern represents the synchronized superposition of all realizations of the signal of interest as viewed within a particular time period. As is well known in the art, the eye pattern is a useful tool for analyzing the effects of inter-symbol interference such as may be caused by time delay spread.

Figure 2:
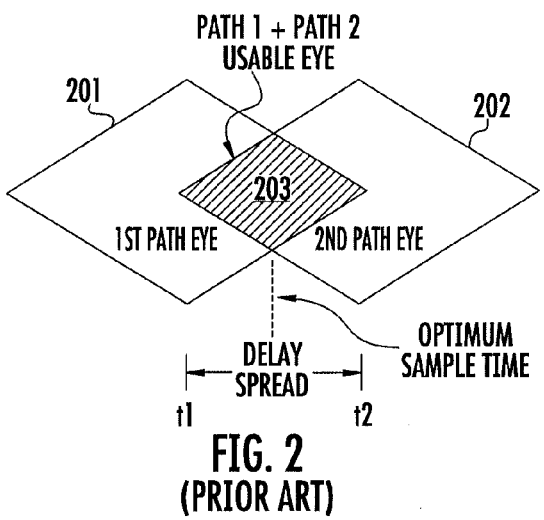
FIG. 2 is a simplified model that is useful for understanding the effects of delay spread on an eye-pattern of received signals.

Referring now to FIG. 2 there is shown a simplified model of an eye pattern that is useful for understanding the effects of the delay spread in FIG. 1. The model shows a 1st path eye 201 which represents a symbol received at a first time t1. In this model, delay spread is present and as a result, the same symbol is received from a different transmitter at a time t2. This signal is represented in the model as a 2nd path eye 202. The delay spread in this example is t1-t2. In a scenario such as the one shown in FIG. 2, the usable time period for sampling of the received data occurs during the region represented by the cross-hatching. This usable time period is referred to herein as the usable eye 203. The optimum time for sampling the usable eye in such a scenario is at the center of the usable eye as shown. As delay spread increases, the usable eye will decrease in duration and therefore the importance of accurate symbol synchronization is increased.

In a digital radio communication system a receiver is time synchronized with a transmitter to facilitate decoding of transmitted symbols. Current terminal design methodology typically involves correlating a known reference symbol pattern against a burst of synchronization symbols contained in a synchronization field of a received data transmission. However, the number of synchronization symbols can be so limited within the data stream that it takes a long time for the receiver to converge to optimal time synchronization. In order to more fully understand this problem, it is useful to consider the P25 standard for radio communication.

The P25 Phase 2 Media Access Control (MAC) standard describes a traffic channel which can be used for transmitting voice data between two or more radio transceivers. A detailed discussion of the P25 MAC standard is beyond the scope of this invention. Briefly however, the standard describes a traffic channel comprised of a plurality of ultraframes where each ultraframe contains four superframes. The traffic channel is logically subdivided into two voice channels which are designated VCH0 and VCH1. The time slot structure of each superframe is dependent upon whether the particular superframe is being used for the inbound interface or the outbound interface.

Referring now to FIG. 3 there is shown a plurality of time slots 305, 308 associated respectively with an outbound VCH0 voice channel 302 and an inbound VCH0 voice channel 304 in accordance with a P25 MAC standard. The outbound interface includes time slots 305, 308 contain voice information or other types of user data. A signaling field is provided between time slots. The signaling field is referred to as the Interslot Signaling Channel or ISCH. The ISCH alternately includes two 40 bit segments which comprise either information (I-ISCH) or a synchronization pattern (S-ISCH). The S-ISCH signaling fields are identified as 306 in FIG. 3. The S-ISCH fields are 20 symbol patterns (3.3 milliseconds in duration) occurring on average, every 60 milliseconds. This synchronization pattern or S-ISCH is used by a receiver to synchronize the decoding of received symbols. The important thing to appreciate about the S-ISCH for purposes of the present invention is that they comprise a relatively small number of synchronization symbols as compared to the transmitted data stream. Since the synchronization symbols are so limited in quantity, the current method for determining time synchronization takes a long time to converge to the center of the usable eye when operating in a high delay spread environment. This time delay substantially increases the time to establish initial synchronization and begin a call.

As noted above, synchronization involves finding the optimal sample position at the center of the usable eye. One aspect of the present invention concerns methods and systems for accelerating the rate at which a terminal can establish synchronization based on a received digital data signal. Unlike systems that rely upon a limited number of symbols contained in synchronization fields, the arrangements described herein will use all received symbol data. The method described herein will also compare measured symbol values to known or expected symbol values. The result is a much more rapid process for determining the optimal sample time.

In the process described herein, the received demodulated soft data is first compared at each sample position to the k known hard symbol values. The goal of this step is to find the distance between the soft value and the nearest hard symbol neighbor. As used herein, the phrase "soft data" is intended to refer to the actual sampled or measured output produced by demodulating and filtering a phase modulated communication signal such as a PSK, C4FM or CQPSK type signal. When demodulated and filtered, such a signal will typically have an amplitude that varies over time in accordance with a plurality of symbol states. Each symbol state will correspond to a have known or expected amplitude, and each amplitude value has a predefined meaning associated with a specific bit pattern. The known or expected amplitude for a particular symbol state is referred to herein as the "hard symbol value".

Figure 4A:
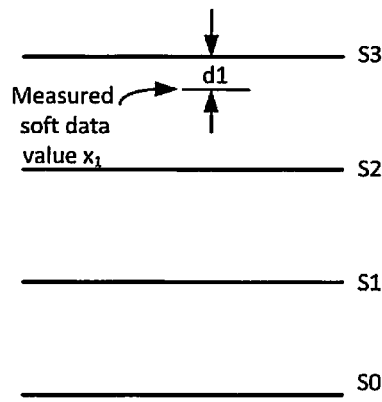
FIGS. 4A-4C are useful for understanding how an error distance is determined using measured soft data and the nearest known symbol values.
Figure 4B:
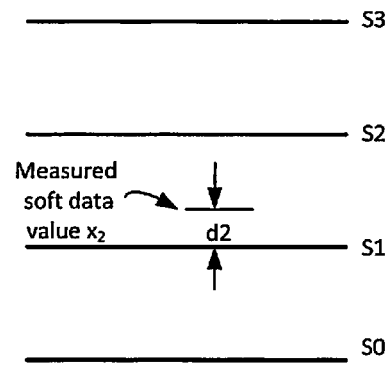

FIGS. 4A and 4B show two examples where demodulated soft data $x_1$, $x_2$ are evaluated to determine the distance between measured soft data and the closest known hard symbol values. In each case, the error is the distance between a measured soft data value $x_i$ and the known hard symbol value of the closest symbol Sk. In the examples shown k=0, 1, 2, 3 so there are four possible known hard symbol values Sk which are represented in the figures by values S0, S1, S2, and S3. In FIG. 4A the actual measured soft data value for this particular sample is $x_1$. The closest hard symbol value neighbor in this example is S3. However, the value of $x_1$ is slightly less than the known value of S3 by a distance or amount equal to d1. The distance d1 is the error in this example. In FIG. 4B, the measured soft data value is $x_2$. The closest hard symbol neighbor in this example is S1. However, the value of $x_2$ exceeds the known hard symbol value of S1 by a distance d2. The distance d2 is the error in FIG. 4B.

Figure 4C:
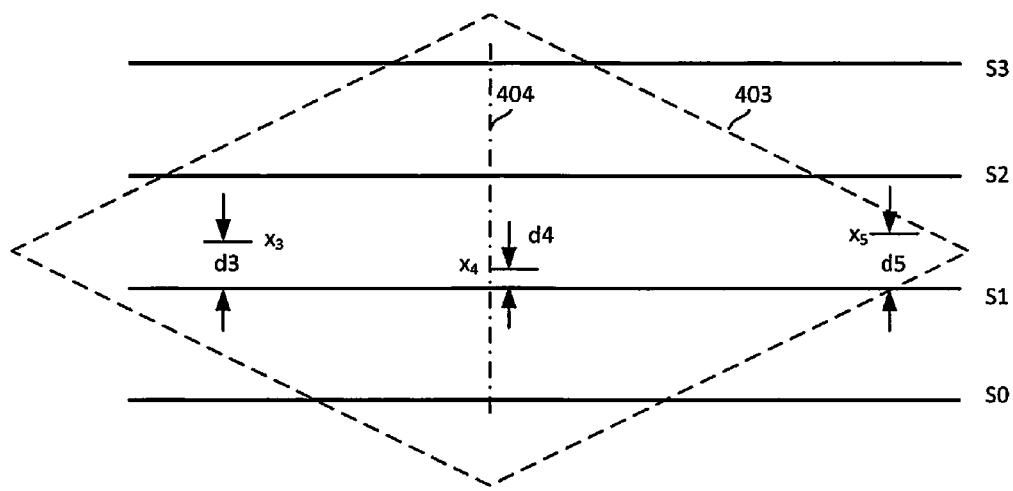

FIG. 4C is similar to FIGS. 4A and 4B but shows soft value data is acquired (oversampled) at several sample times over the duration of one symbol. Also, a usable eye 403 is superimposed over the diagram to illustrate a time when each soft value data sample $x_3$, $x_4$ and $x_5$ is acquired relative to the timing of the usable eye. It can be observed that soft value $x_4$ is acquired at approximately the center of the usable eye, whereas soft values $x_3$ and $x_4$ are acquired nearer the extremities of the usable eye. In general, error distance d will be minimized when the sample time or position from which the soft data is obtained is close to the center of the usable eye 403. It can be observed in FIG. 4C that the error distance d4 is less than the error distance d3 and d5. Accordingly, the sample position that results in the minimum error distance, averaged over a number of symbols will be close to the center of the usable eye. By evaluating error distance in this way, an approximate center of the usable eye 404 can be determined.

Once the approximate center of the usable eye is determined, the process proceeds to a second step. In the second step, further refinement is obtained regarding the optimal sample time associated with minimum error. In this second step, the optimal sample time or position is obtained via a curve fitting process that uses the minimum average distance sample (e.g. soft data sample $x_4$), and the average distance computed for samples on each side of the minimum distance sample (e.g. soft value samples $x_3$ and $x_5$). A quadratic equation fitting process has been found to work well for this step, but other curve fitting processes can also be used. This fitting process facilitates a better estimation of a minimum point in the error curve representing the optimal sample time. The optimal sample time as determined by this second step is then used to design a sinc interpolator to resample the original data to the optimal location, effectively providing a higher symbol oversample rate. The various aspects of the inventive arrangements will now be described in further detail.

Figure 5:
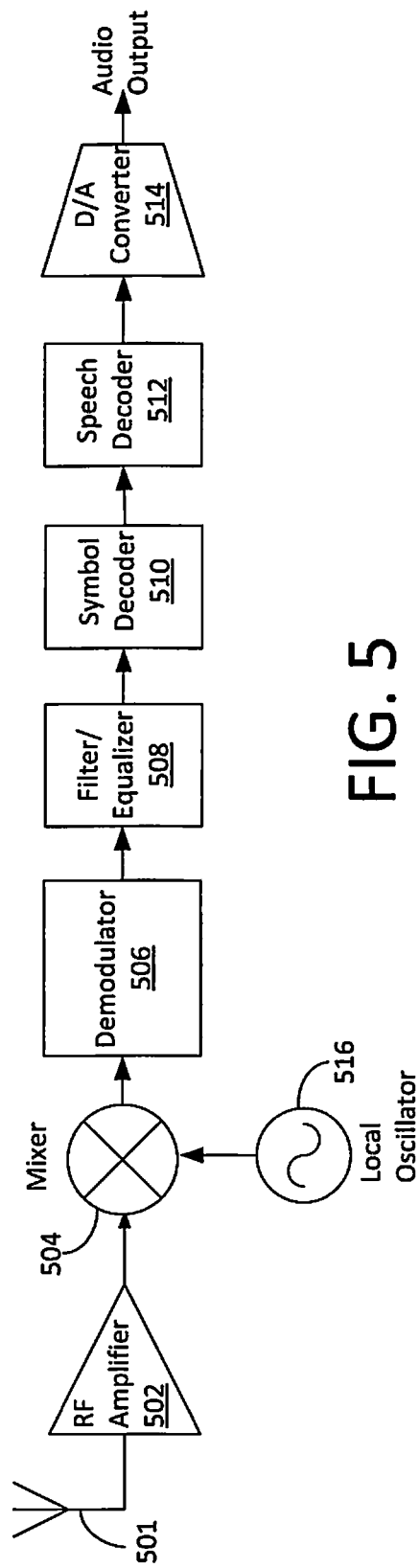
FIG. 5 is a schematic illustration of an exemplary communication system that is useful for understanding the present invention

Referring now to FIG. 5 there is shown an exemplary architecture for a digital data receiver including RF amplifier 502, mixer 504, demodulator 506, filter/equalizer 508, symbol decoder 510, speech decoder 512, and D/A converter 514. The digital data receiver can be configured to receive signals transmitted according to a phase shift type of digital data modulation scheme such as PSK, C4FM or CQPSK. Most of the components of the digital data receiver are well known in the art and therefore will not be described in detail. However, it will be appreciated that signals received at antenna 501 are amplified in low noise RF amplifier 502 before being passed to mixer 502. The mixer uses a local oscillator signal received from a local oscillator 516 to down-convert the received RF signal to an intermediate frequency (IF). After down-conversion, the IF signal is communicated to a demodulator 506 where the IF signal is demodulated to obtain a time varying baseband signal in which the amplitude of the signal varies in accordance with each symbol that has been received. After the data has been demodulated at 506 additional filtering can be applied at filter/equalizer 508. The resulting demodulated output, which has an amplitude that varies over time in accordance with a received symbol, is then communicated to a symbol decoder 510 to extract the digital data bits represented by each symbol. The extracted data in this example is speech information and so the data is communicated to a speech decoder 512. The speech decoder converts the digital data into digital audio data and passes this information on to the D/A converter 514. The D/A converter will convert the digital audio data into analog audio which can be reproduced at a loudspeaker (not shown).

In the receiver system shown in FIG. 5, the symbol decoder 510 will periodically sample the amplitude or value of the demodulated signal to determine what symbol has been sent. To this end, it is advantageous for the symbol decoder 510 to have timing information so as to determine the optimal moment when each symbol should be sampled. The inventive arrangements facilitate improvements in the operation of the symbol decoder by accelerating the rate at which the symbol decoder can determine the optimal time for sampling the symbol data. This process will now be described in further detail in relation to FIG. 6.

A method for improving symbol sampling in a high time delay spread interference environment begins at 601 and continues to 602 where a time varying baseband waveform is acquired. The baseband waveform can be acquired using suitable receiver processing circuitry similar to that described herein with respect to FIG. 5. At 603, the baseband waveform is sampled at a rate m times the symbol rate. For example the sample rate can exceed the symbol rate by a factor of 3× or more. Note that a minimum value of m=3 is necessary to perform the quadratic fit operation. According to one aspect of the invention, the sample rate can be 4× greater than the symbol rate. At 604 an error metric err(t, m) is calculated at the oversample rate, where t is a unit of time and m is the oversample rate. The error determination technique was generally described above in relation to FIGS. 4A-4C and can be expressed mathematically as:

$$\text{err}(t,m) = \text{Min over all } k\{\text{abs}(x(t,m) - \text{sym}(k))\} \quad (1)$$

where:
x is the value of the received demodulated soft data
t is a sample time;
m is the symbol oversample rate;
k is an integer that is less than or equal to the number of symbol state values; and
sym(k) is the known symbol value.

After the error err(t, m) has been calculated at 604, the process continues on to 606 where the calculated value of err(t, m) for each sample location m is filtered or averaged to obtain Ferr(t, m). The values are averaged over some predetermined period of time so as to obtain for each value of m a mean or average value of err(t, m). At 607, the average error value at each sample position m is used to plot an error surface.

Figure 7A:
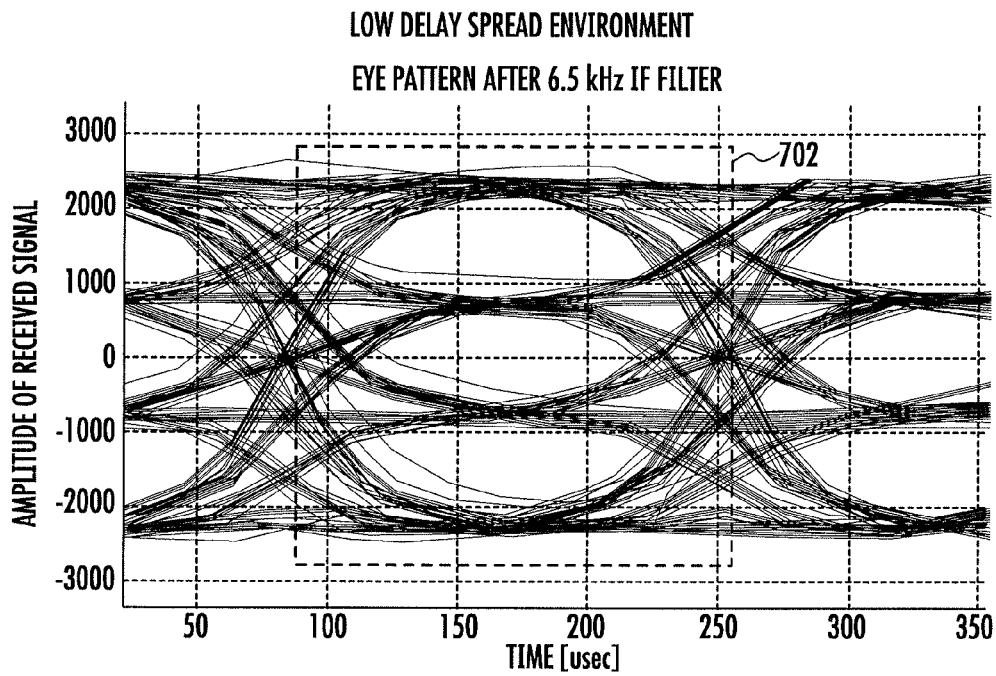
FIG. 7A is an exemplary eye pattern associated with a received signal in a low delay spread environment.
Figure 7B:
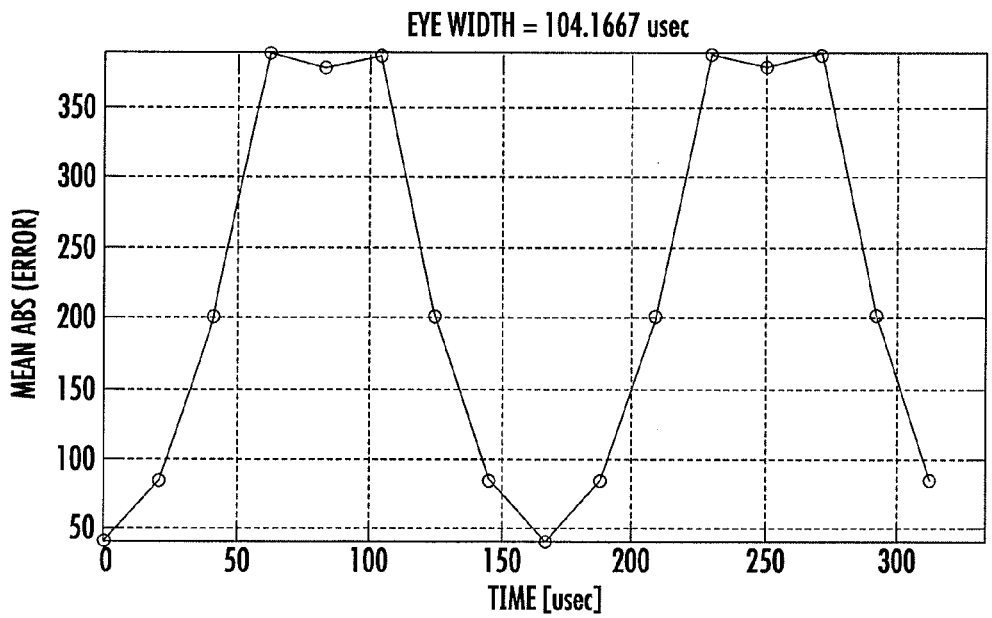
FIG. 7B is a plot of the mean of the absolute value of the error between the measured and the known symbol values for the exemplary eye pattern in FIG. 4A.
Figure 8A:
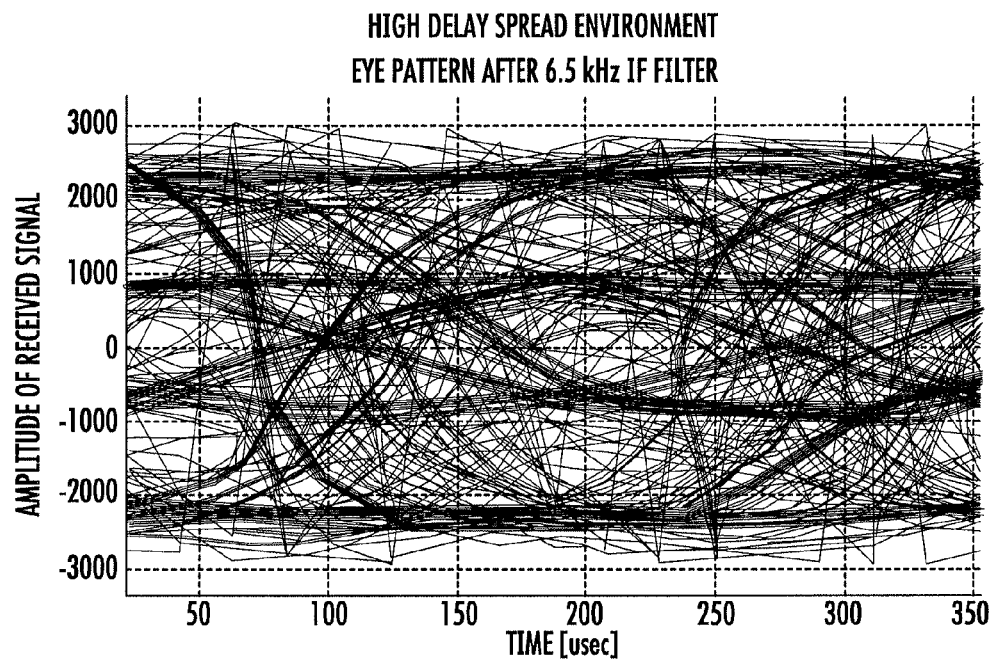
FIG. 8A is an exemplary eye pattern associated with a received signal in a high delay spread environment.

In order to understand steps 602-607 there is shown in FIGS. 7A and 7B an exemplary eye pattern corresponding to the output of filter/equalizer 508. The particular eye pattern in FIG. 7A is associated with a low delay spread environment. Due to the fact that the plot was obtained in a low delay spread environment, the eye pattern is well defined and shows only minimal variation in the pattern over time. In contrast, FIG. 8A shows a similar type pattern acquired in a high delay spread environment (delay spread=50 microseconds). The eye pattern in FIG. 8A is poorly defined due to the delay spread of the received signals.

Figure 8B:
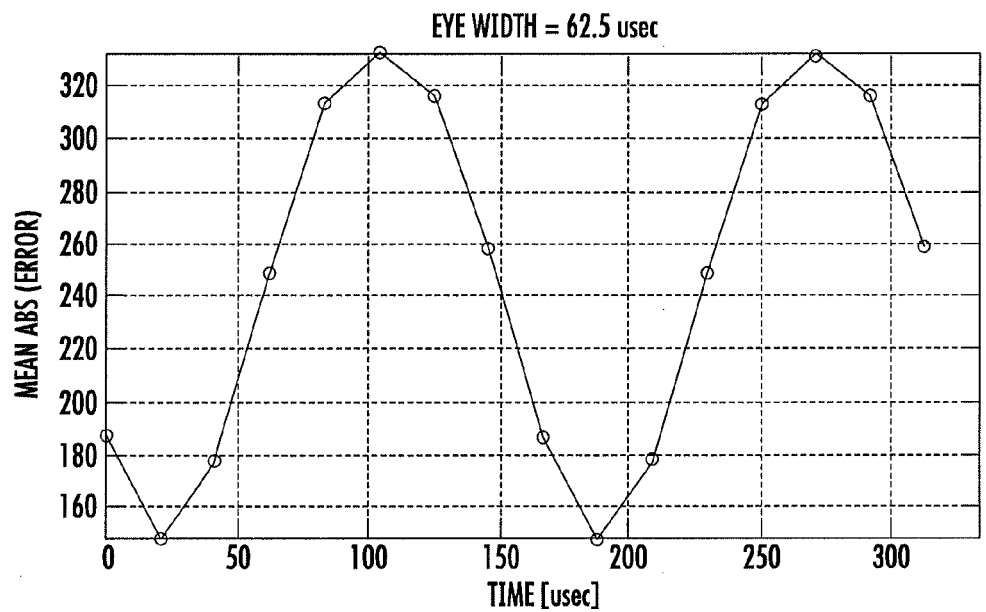
FIG. 8B is a plot of the mean of the absolute value of the error between the measured and the known symbol values for the exemplary eye pattern in FIG. 5A.

Referring now to FIG. 7B, there is provided an error curve plotted from filtered or averaged error data captured from signals associated with the eye pattern of FIG. 7A. The average values of Ferr(t, m) at each sample time m are denoted in FIG. 7B by the circular marks denoted on the plot. As such, the error curve shows for each sample time m the mean of the absolute value of the error as between the measured and known symbol values. It can be observed in FIG. 7B that the error curve reaches a minimum when the time is approximately 165 microseconds. It can also be observed that this time corresponds closely to the center of the eye pattern in FIG. 7A. Similarly, FIG. 8B shows an error curve calculated for the data captured in the high delay spread environment of FIG. 8A. Here, the error metric reaches a minimum when the time is approximately 180 microseconds. In each example the error curve gives an approximate indication of the center of the usable eye.

After the error curve has been generated, the process continues on to step 608 where a sample time t on the error curve is selected where the curve indicates minimum error. This step can be expressed as: Loc(t)=min{Ferr(t,m) over all m}, where Loc(t) is the time when the curve reaches a minimum value. For example, in FIG. 7B this minimum error time would occur where t=165 microseconds. In FIG. 8B, the minimum error point is at approximately t=185 microseconds.

Figure 9A:
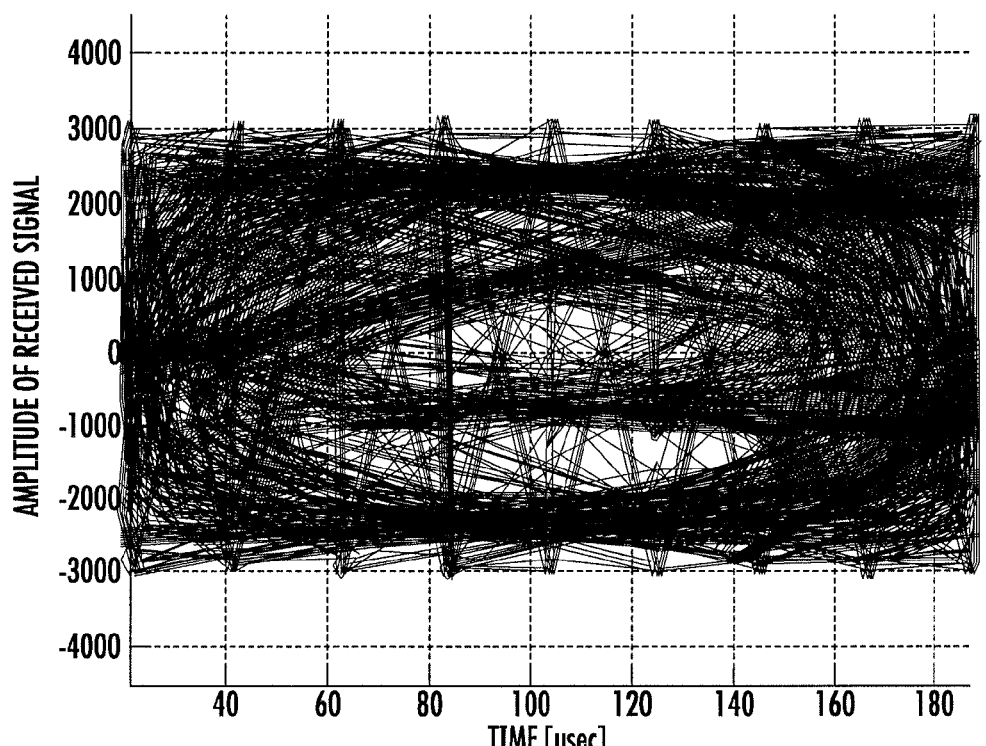
FIG. 9A shows an exemplary eye pattern plot.
Figure 9B:
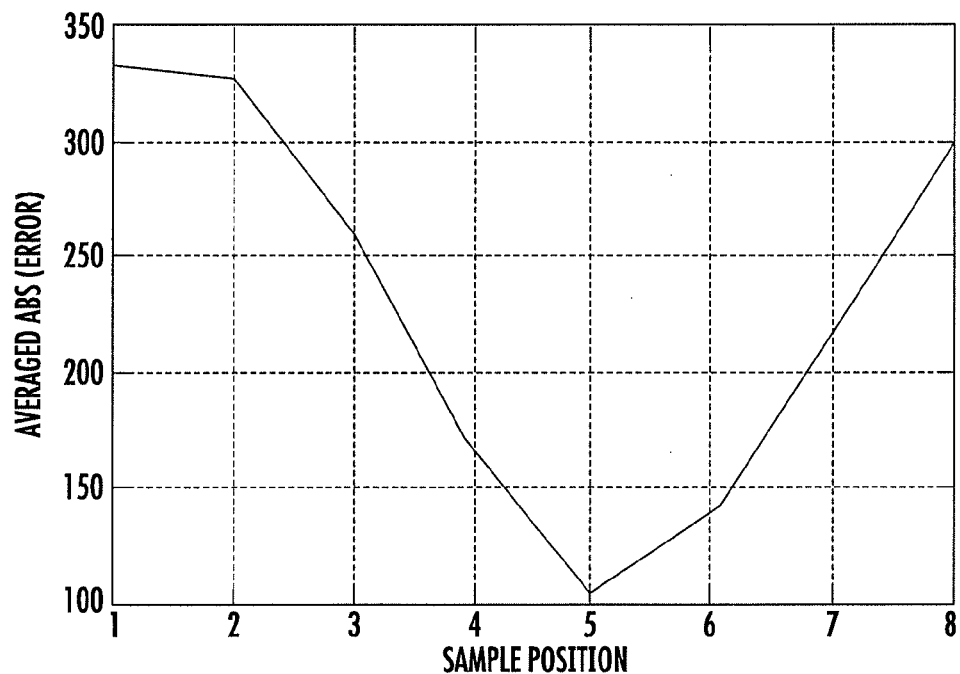
FIG. 9B shows an exemplary plot of the mean of the absolute value of the error between the measured and the known symbol values for the exemplary eye pattern in FIG. 8A, where the optimal sample position is close to one of the sampled positions.
Figure 10A:
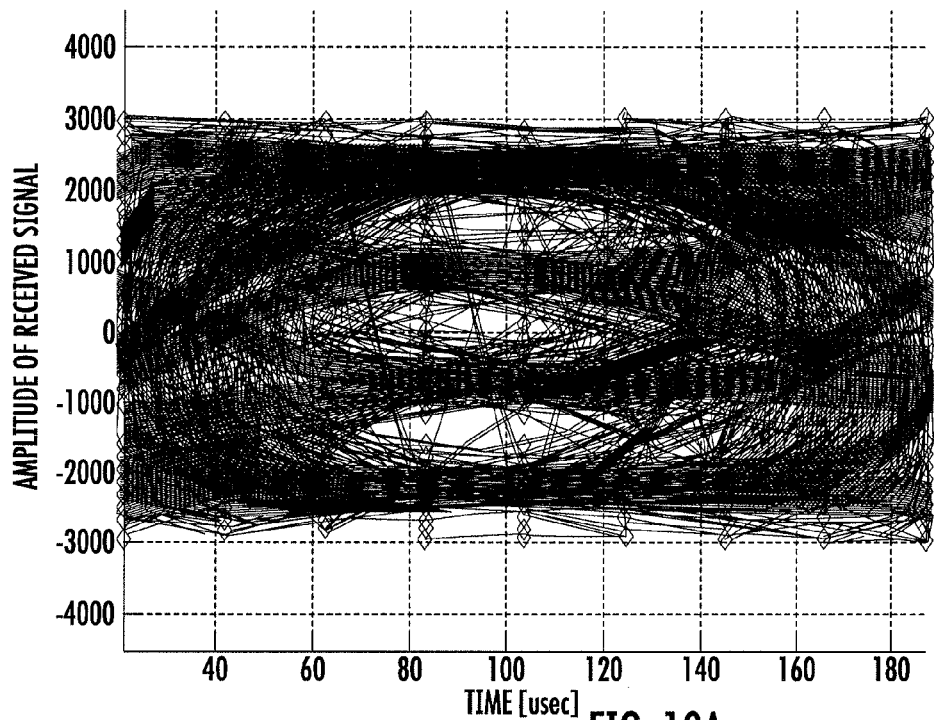
FIG. 10A shows an exemplary eye pattern plot.
Figure 10B:
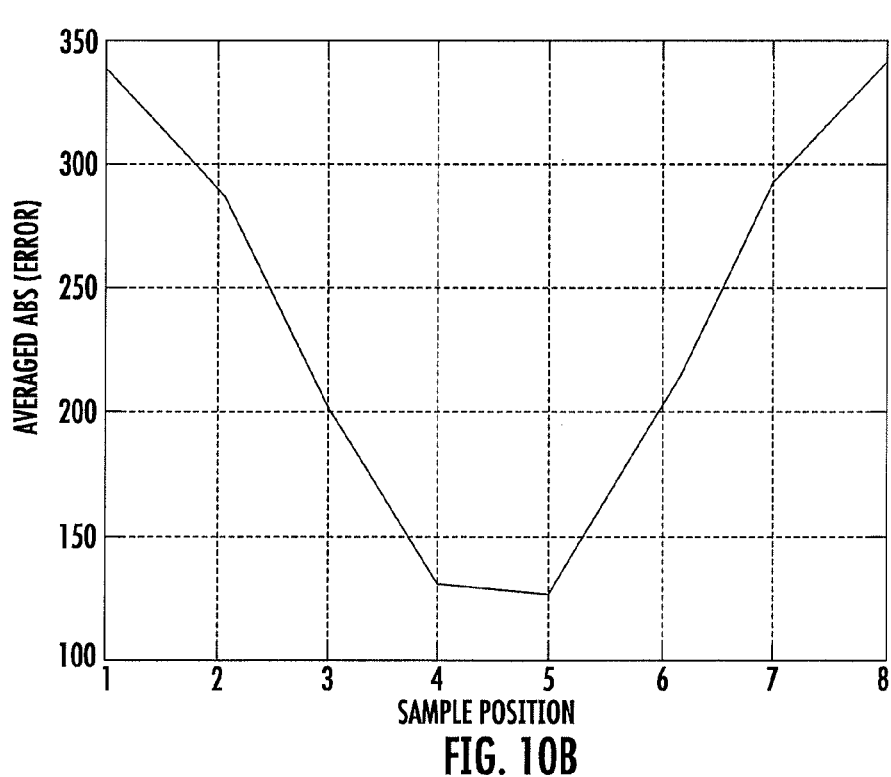
FIG. 10B shows an exemplary plot of the mean of the absolute value of the error between the measured and the known symbol values for the exemplary eye pattern in FIG. 9A, where the optimal sample position is not centered on one of the sampled positions.

In some instances, the minimum average error position expressed as Loc(t) will be close to one of the positions where the data has actually been sampled. This concept is illustrated in FIGS. 9A and 9B wherein there is shown another example of an eye pattern and a resulting error curve generated as described herein. For convenience with regard to this explanation the time axis in FIG. 9B is indexed in accordance with sample position values rather than actual time values. It can be observed in FIG. 9B that the error curve has a minimum mean value that appears to correspond almost exactly with sample position 5. In contrast, with respect to FIGS. 10A and 10B it can be observed that the amplitude of the averaged absolute error is approximately the same magnitude at sample positions 4 and 5. This suggests that the actual minimum error is likely somewhere between these two sample points. Accordingly, it is somewhat unclear in FIG. 10B exactly where the optimum sample point should be. In order to address this problem the process in FIG. 6 advantageously continues on to step 610 wherein the error surface (e.g. the error surface shown in FIG. 10B) is modeled to find a curve of best fit. In other words, selected data points adjacent or close to the minima are used to construct a smoothed error function that best explains the observed data points. A quadratic fit of error surface has been found to work well for this purpose. The fitted curve can be constructed for Ferrr(t, m) over the domain m=Loc(t−1): Loc(t+1), where t=0 is the sample time having the lowest mean error. Stated differently, it can be said that we evaluate Ferr(t, Loc(t−1): Loc(t+1)) around the lowest mean error value to construct a curve that is fitted to the error data.

Figure 11:
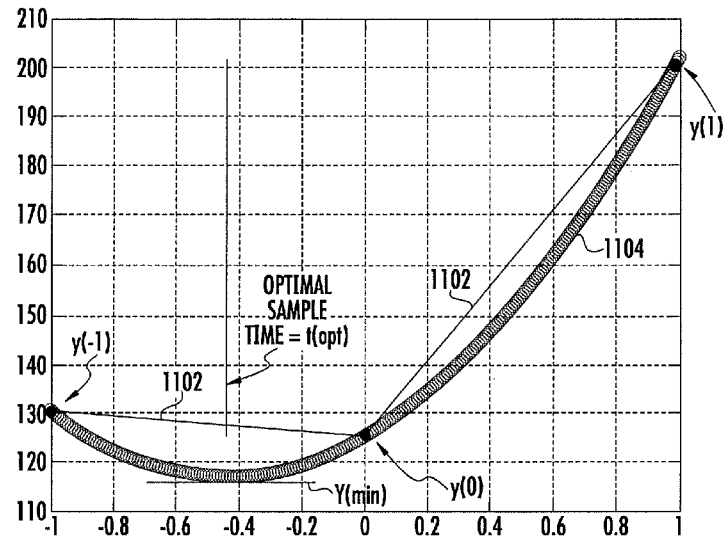
FIG. 11 is a drawing that is useful for understanding how an error surface which is modeled as a quadratic equation refines the sample position to a higher accuracy.

This foregoing concept is illustrated in FIG. 11 which shows sample data y(−1), y(0) and y(+1) as measured at sample positions −1, 0, and +1 (i.e., sample positions corresponding to Loc(t−1), Loc(t) and Loc(t+1). Note that the error curve 1102 has a limited number of data sample points and is therefore comprised of a plurality of linear segments. The data points y(−1) and y(0) are at approximately the same value, suggesting that the actual minimum value may occur somewhere between sample time t=−1 and t=0. In order to estimate the time t(opt) corresponding to the actual error minimum y(min), a quadratic curve fitting process is used. The standard form of a quadratic equation is:

$$y(t)=at^2+bt+c \qquad (2)$$

By using the measured data values y(−1), y(0) and y(+1), the constants a, b and c from equation (2) can be calculated as follows:

$$\begin{bmatrix} 1 & -1 & 1 \\ 0 & 0 & 1 \\ 1 & 1 & 1 \end{bmatrix} \begin{bmatrix} a \\ b \\ c \end{bmatrix} = \begin{bmatrix} y(-1) \\ y(0) \\ y(1) \end{bmatrix}$$

The inflection point of a best fit quadratic equation will provide a useful estimate of the true minimum point of the error curve in FIG. 11. A quadratic fit 1104 of the error surface 1102 is shown in FIG. 11. The inflection point for a curve defined by a quadratic equation (2) can be stated as:

$$t(opt)=-b/2a, \qquad (3)$$

where t(opt) represents an improved estimate of the optimum sample time where the error curve will be at its minimum point y(min) as suggested by the measured data and the quadratic curve fitting in step 610. It can be observed in FIG. 11 that by using the foregoing equation (3) the optimal sample time is determined to occur at a normalized offset of approximately −0.45 relative to sample time zero.

The foregoing steps 604-610 are useful for identifying the optimum time when the received symbol data should have been measured in order to minimize error. In most instances however, the actual sample times will not coincide with the optimum sample time. Accordingly, an interpolation step 612 is provided to estimate a symbol value at t(opt). The symbol estimate will be an interpolated symbol value based on the actual sample values obtained at sample times before and after the optimum sample time. The goal here is to compute a symbol value at an arbitrary continuous time t(opt) using the available set of discrete-time samples. Any suitable interpolation method can be used for this purpose. However, it has been determined that a Hann windowed sinc function with a time offset t(opt) can provide a resample filter which will effectively interpolate a higher fidelity data value. Sinc interpolators are well known in the art and therefore will not be described here in detail. It should be noted that a windowed sinc interpolator is preferred for its ability to maintain the fidelity of the resampled signal. The length of the sinc filter which is applied can be designed to maintain any desired level of interpolation loss.

Figure 12:
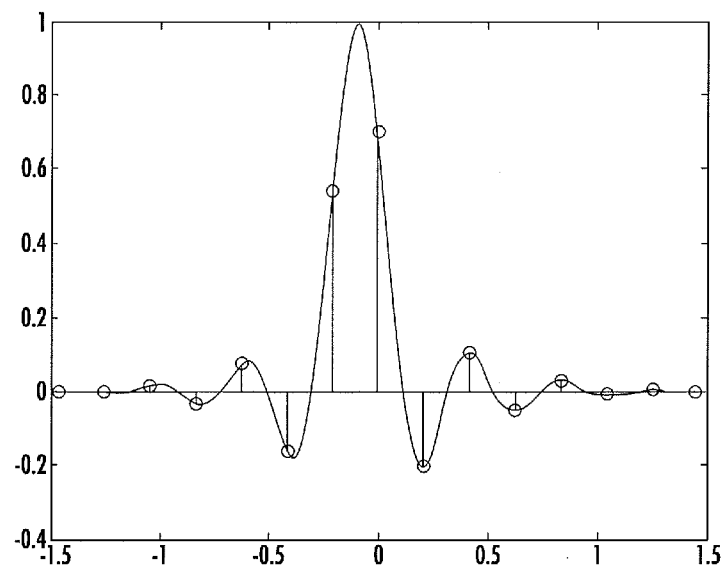
FIG. 12 is a Hann windowed Sinc function with optimal time offset, which is used as a resample filter to interpolate a best data value.

As shown in FIG. 12, once the time offset value, t(opt), has been found via finding the time location of the minimum of the quadratic surface, a sinc filter can be designed to effectively provide a sample of the input data at the time shifted location. In FIG. 12 the sinc filter representing a time shift of −0.45 samples corresponding to t(opt)=−0.45 is shown. The interpolation described herein effectively provides a higher sample rate of the data, but advantageously only needs to be performed once per symbol.

Figure 13A:
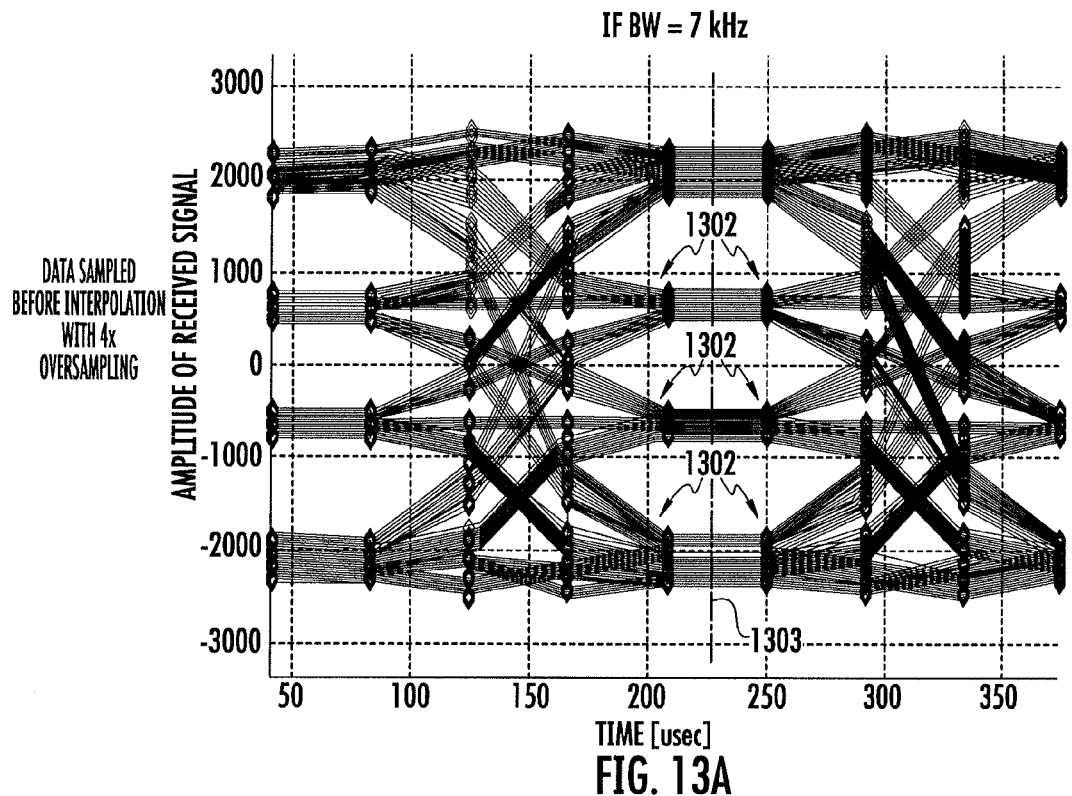
FIG. 13A is an eye pattern plot which shows data sampled before interpolation.
Figure 13B:
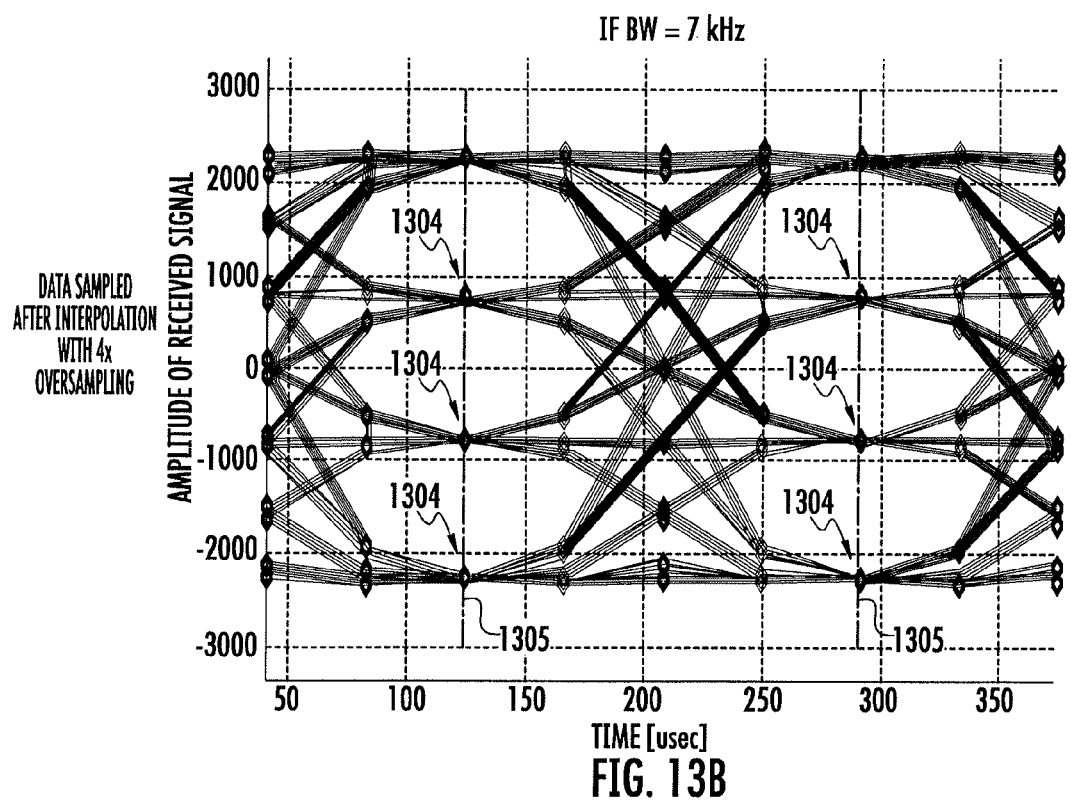
FIG. 13B is an eye pattern plot which shows the data sampled after interpolation.

Referring now to FIG. 13A an eye pattern is shown wherein data is sampled prior to interpolation. More particularly, it can be observed that sample times 1302 do not align with the center of each eye 1303. Conversely, FIG. 13B shows that by using the methods described herein the effective sample time 1304 occurs in alignment with the center of the eye 1305. Note here that we refer to an "effective" sample time 1304 because the actual sample time (i.e., the time when the actual sampling is performed by the decoder hardware) will not generally correspond to the effective sample time after interpolation. In this regard, the interpolation effectively shifts the sample time to the optimal sample time, and provides the benefit of a higher sample rate. This higher effective sample rate is accomplished while avoiding additional processing and computational complexity normally required of such higher sample rate. At 613 a determination can be made as to whether additional data is to be acquired, and if so (613: Yes), then the process returns to 602 and continues. Otherwise the process terminates at 614.

Figure 6:
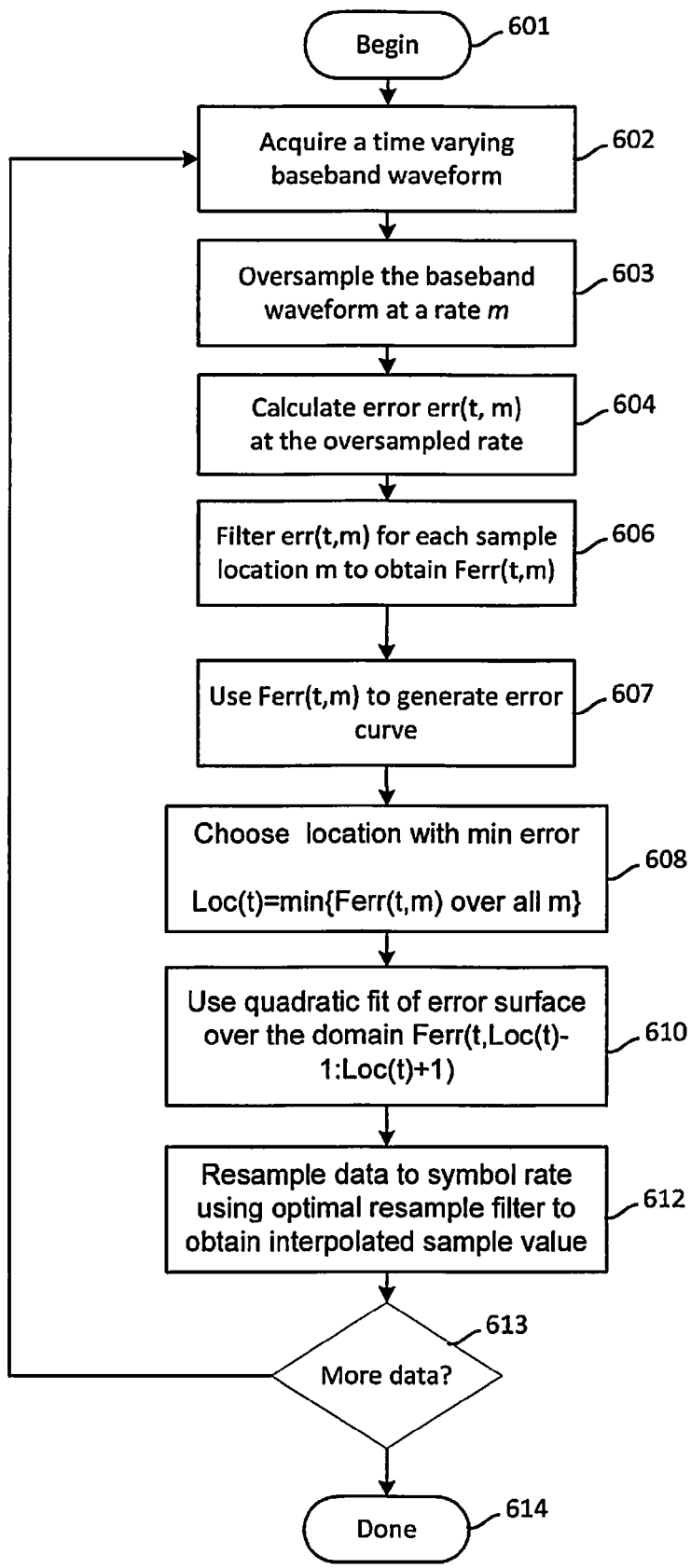
FIG. 6 is a flow chart that is useful for understanding a method for improving symbol sampling.

The method described herein with respect to FIG. 6 provides a significant advantage insofar as it converges to best sample position much more rapidly as compared to conventional methods. For example, in the context of a P25 waveform where delay spread is 60 microseconds, the algorithm described herein will converge to the optimal sample time in less than 100 milliseconds, using all received data. In contrast, conventional algorithms relying on the limited number of synchronizing symbols for determining the optimal sample position would require up to 1.8 seconds to arrive at the optimal sample time. For purposes of the present disclosure, the process will be deemed to have sufficiently converged to an optimal sample time when further evaluation of the data will provide only minimal improvement in the bit error rate. For example, the process can be deemed to have converged to an optimal sample time when further evaluation of the data will lead to no more than a 5% improvement in the bit error rate.

Figure 14:
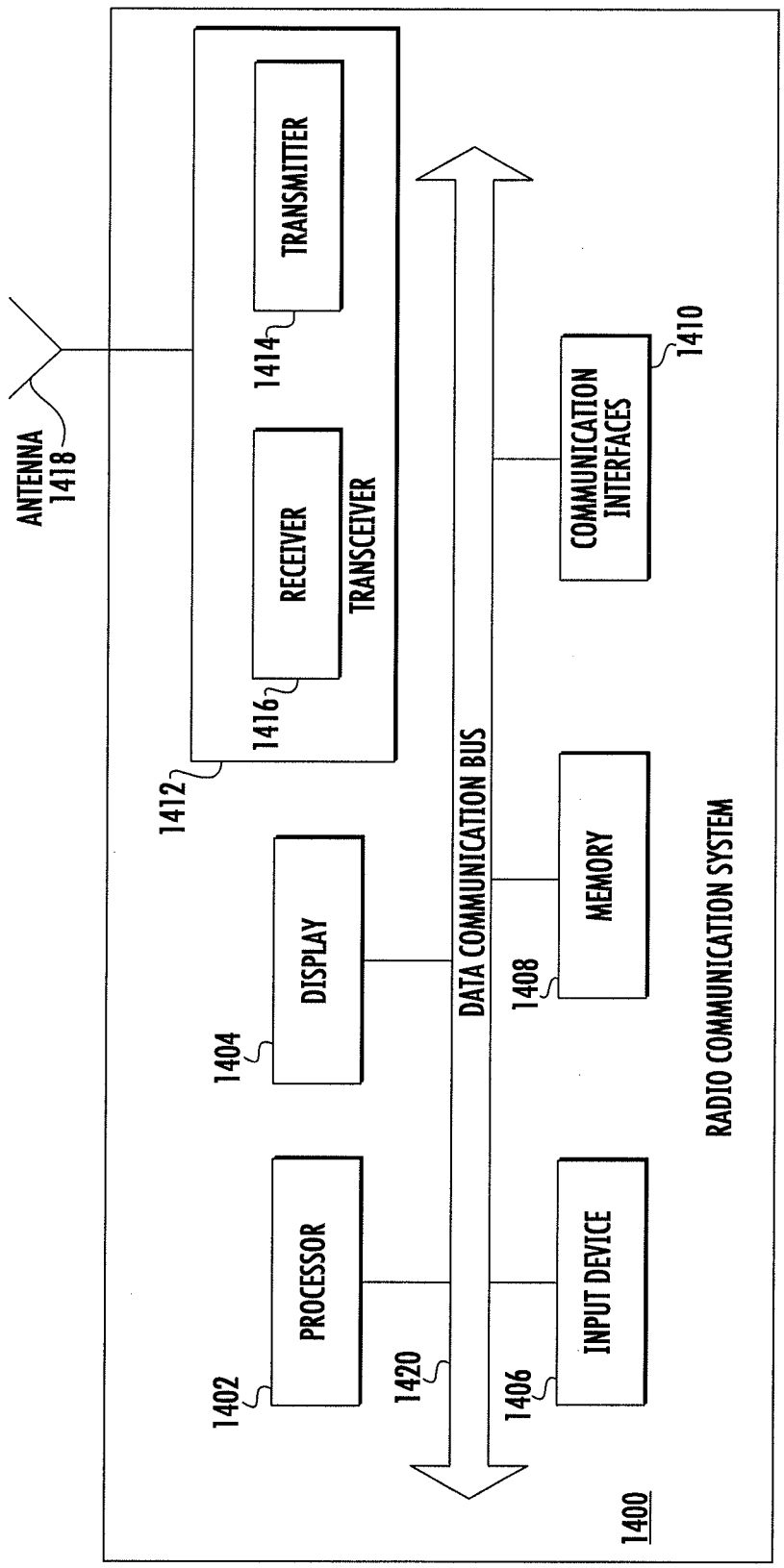
FIG. 14 is an architectural diagram of a radio communication system that is useful for understanding the invention.

Referring now to FIG. 14 there is shown a simplified block diagram of a radio communication system 1400 that is useful for understanding the invention. The radio communication system 1400 includes a computer processing unit such as processor 1402. The system also includes a transceiver 1412 which is comprised of a transmitter 1414 and a receiver 1416. An antenna 1418 is coupled to the transceiver to facilitate RF communication. The receiver 1416 is configured to receive RF signals on one or more frequency bands. The transmitter 1414 is advantageously configured to transmit RF signals on one or more frequency bands corresponding to a particular communication protocol. A data communication bus 1420 can be used to communicate digital data as needed among the various components comprising the radio communication system.

The communication system can include a user interface such as display 1404 for communicating information to a user. An input device 1406 is provided for purposes of allowing a user to enter control commands and other types of information. The user input device can include a keypad, a pointing device and any other suitable types of user input hardware. Suitable communication interface hardware 1410 is provided to facilitate communication input and output to the radio communication system. For example, the communication interface hardware can include a microphone for detecting user audio (e.g. speech input) and a loudspeaker for reproducing received audio.

A memory 1408 is provided for storing programming instructions which are executed by the processor 1402, and data needed for operations of the radio communication system 1400. Any suitable type of memory can be used for this purpose. For example, the memory 1408 can include one or more of a hard disk drive, a CD-ROM (compact disk read-only memory), RAM (random-access memory) or ROM (read-only memory), a flash memory card and so on. Any type of non-transitory storage medium capable of storing program instructions and digital data can be used for this purpose. The programming instructions can include the symbol decoder processing methods described herein.

The processor 1402 is comprised of one or more computer processing elements. For example the computer processing elements can include a digital signal processor (DSP), a general purpose microprocessor, a microcontroller, and/or any other processing device which can be controlled using software or programming instructions. The operating instructions or computer software described herein can be stored in the memory 1408, but can also reside in memory (not shown) included within the processor 1402. According to one aspect of the invention, the communication system 1400 can be configured to implement radio communications in accordance with a P25 communication protocol.

The transmitter 1414 and receiver 1416 are configured to facilitate RF communication of data to and to communicate information bursts or packets from other radio communication systems. As such, transmitter 1414 and receiver 1416 can include conventional communication circuitry to enable digital data transmission over a wireless communication channel. Those skilled in the art will appreciate that the particular architecture shown in FIG. 14 is exemplary and merely represents one possible arrangement of a communication system suitable for implementing the processing methods described herein. The radio communication system can be implemented as part of an architecture including hardware and/or software in accordance with known techniques. Those skilled in the art will recognize that certain functions of the transmitter 1414 and/or receiver 1416 may be implemented in a processor or processors, such as the processor 1402.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The methods described herein can be implemented on a computer system. The computer system can comprise various types of computing systems and devices, including a server computer, a client user computer, a personal computer (PC), a tablet PC, a laptop computer, a desktop computer, a control system, or any other device capable of executing a set of instructions (sequential or otherwise) that specifies actions to be taken by that device. Further, while a single processing device can be used the phrase "computer system" shall be understood to include any collection of computing devices that individually or jointly execute a set (or multiple sets) of instructions to perform any one or more of the methodologies discussed herein.

The methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein. The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for symbol sampling in a digital communication system, comprising:
    acquiring a time varying baseband waveform in which a signal amplitude varies between one of a plurality of symbols;
    sampling the waveform at a rate of m times the symbol rate;
    during an evaluation time, calculating an error value for each of m data sample positions, each said error value comprising an average distance between the measured value of said waveform as indicated by said data sample and a closest known symbol value; and
    determining an optimal sample time based on said plurality of error values.

2. The method according to claim 1, wherein said determining of said optimal sample time further comprises identifying an approximate time relative to said data sample positions when said error value is minimized.

3. The method according to claim 1, wherein said determining of said optimal sample time further comprises selecting at least one of said m data sample positions where said error value is minimized.

4. The method according to claim 1, further comprising interpolating to determine an estimated sample value of said waveform corresponding to a sample time which is intermediate of said m data sample positions.

5. The method according to claim 1, further comprising generating a resample filter based on said optimal sample time.

6. The method according to claim 1, further comprising selecting said evaluation time to be of a minimum duration sufficient to allow convergence to an optimal sample time.

7. The method according to claim 3, wherein a plurality of said m data sample positions are selected and said determining of said optimal sample time further comprises calculating a curve which is fitted to the filtered error values corresponding to the selected ones surrounding the data sample position where said error value is minimized.

8. The method according to claim 5, further comprising re-sampling said time varying baseband waveform using said resample filter to estimate said signal amplitude at said optimal sample time.

9. The method according to claim 7, wherein an inflection point of the curve defines an optimal sample time when said error value is minimized.

10. The method according to claim 7, wherein said curve is defined by a quadratic equation.

11. A radio frequency (RF) communication device, comprising
    an RF receiver configured to acquire a time varying baseband waveform in which a signal amplitude varies between one of a plurality of symbol states; and
    at least one electronic circuit which is configured to
    sample the waveform at a rate of m times the symbol rate;
    during an evaluation time, calculate an error value for each of m data sample positions, each said error value comprising an average distance between the measured value of said waveform as indicated by said data sample and a closest known symbol value; and
    determine an optimal sample time based on said plurality of error values.

12. The RF communication device according to claim 11, wherein said at least one electronic circuit is further configured to determine said optimal sample time by identifying an approximate time relative to said data sample positions when said error value is minimized.

13. The RF communication device according to claim 11, wherein said at least one electronic circuit is further configured to determine said optimal sample time by selecting at least one of said m data sample positions where said error value is minimized.

14. The RF communication device according to claim 11, wherein said at least one electronic circuit is further configured to interpolate an estimated sample value of said waveform corresponding to a sample time which is intermediate of said m data sample positions.

15. The RF communication device according to claim 11, wherein said at least one electronic circuit is further configured to generate a resample filter based on said optimal sample time.

16. The RF communication device according to claim 11, wherein said evaluation time is of a minimum duration sufficient to allow convergence to an optimal sample time.

17. The RF communication device according to claim 13, wherein said at least one electronic circuit is further configured to select a plurality of said m data sample positions, and determines said optimal sample time by calculating a curve which is fitted to the error values corresponding to the surrounding ones of the data sample position where said error value is minimized.

18. The RF communication device according to claim 15, wherein said at least one electronic circuit is further configured to re-sample said time varying baseband waveform using said resample filter to estimate said signal amplitude at said optimal sample time.

19. The RF communication device according to claim 17, wherein an inflection point of the curve defines an optimal sample time when said error value is minimized.

20. The RF communication device according to claim 17, wherein said curve is defined by a quadratic equation.

* * * * *